United States Patent [19]
Fuchs et al.

[11] Patent Number: 5,666,779
[45] Date of Patent: Sep. 16, 1997

[54] METHOD OF FORMING A PRESSURE FREE EXPANSION ANCHORAGE

[75] Inventors: Werner Fuchs, Schwaikheim; Antonius Winkeljann, Landsberg, both of Germany

[73] Assignee: Hilti Aktiengesellschaft, Schaan, Liechtenstein

[21] Appl. No.: 669,659

[22] Filed: Jun. 24, 1996

[30] Foreign Application Priority Data

Jun. 24, 1995 [DE] Germany .................. 195 23 039.6

[51] Int. Cl.⁶ .................. F16B 39/02; E21D 20/00
[52] U.S. Cl. .................. 52/705; 52/711; 52/742.14; 52/745.21; 411/82
[58] Field of Search .................. 52/742.1, 742.13, 52/742.14, 742.15, 745.21, 698, 704, 705, 707, 711; 411/82; 405/259.5, 259.4, 259.3

[56] References Cited

U.S. PATENT DOCUMENTS

| | | | |
|---|---|---|---|
| 4,141,190 | 2/1979 | Shimada | 52/771 |
| 4,211,049 | 7/1980 | Fischer | 52/742.15 X |
| 4,475,329 | 10/1984 | Fischer | 411/82 X |
| 4,763,396 | 8/1988 | Fischer | 411/82 X |
| 4,893,974 | 1/1990 | Fischer et al. | 411/82 |
| 5,249,899 | 10/1993 | Wilson | 411/82 |
| 5,360,302 | 11/1994 | MacMartin | 411/82 X |
| 5,483,781 | 1/1996 | Ernst et al. | 52/698 |

*Primary Examiner*—Christopher Todd Kent
*Attorney, Agent, or Firm*—Anderson Kill & Olick, P.C.

[57] ABSTRACT

A method forming a pressure-free expansion anchor in a cylindrical borehole (2) with an undercut (3) in a receiving material forming an anchorage, with an undercut expansion dowel (5) inserted into the borehole. The dowel (5) has an axially-extending threaded rod (9) extending through a sleeve (6) with outwardly displaceable segments (7) on the sleeve for effecting a positive lock in the region of the undercut. The method involves introducing a curable mortar (M) into the region of the undercut, where the mortar forms a bond with the region of the undercut and the displaced elements (7) of the sleeve (6).

3 Claims, 3 Drawing Sheets

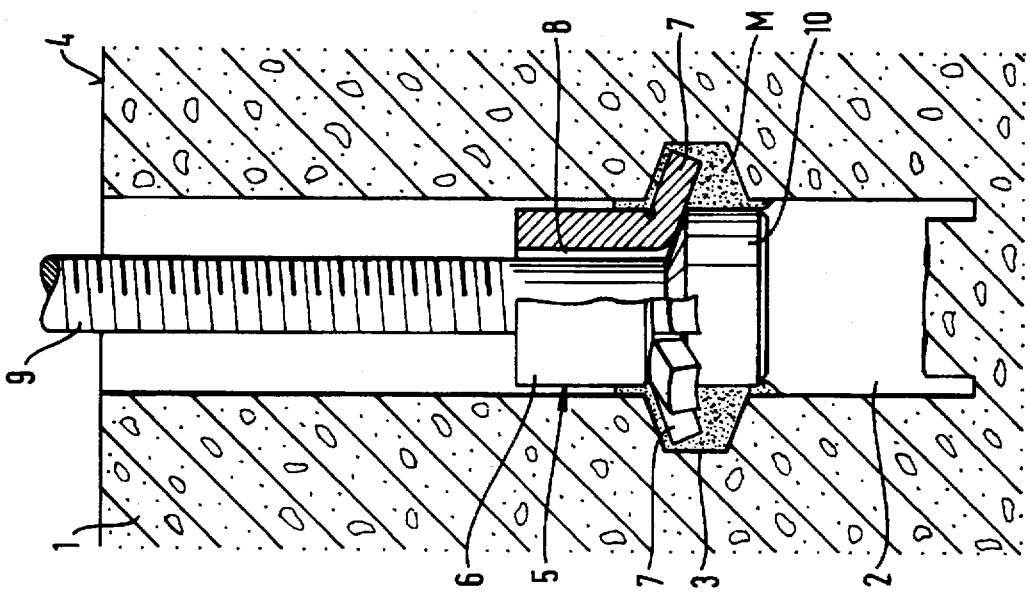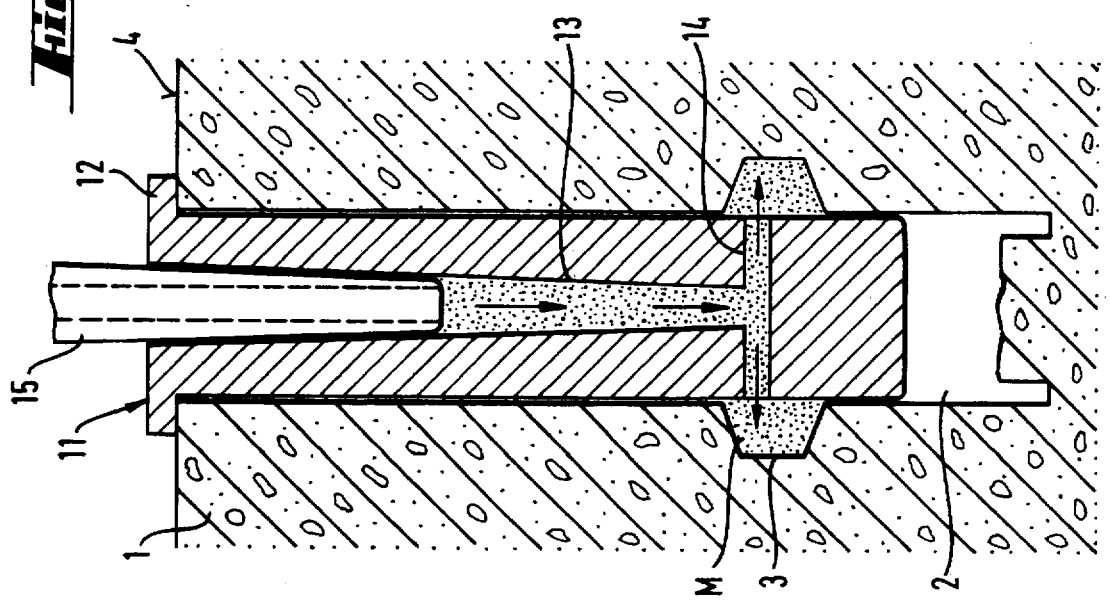

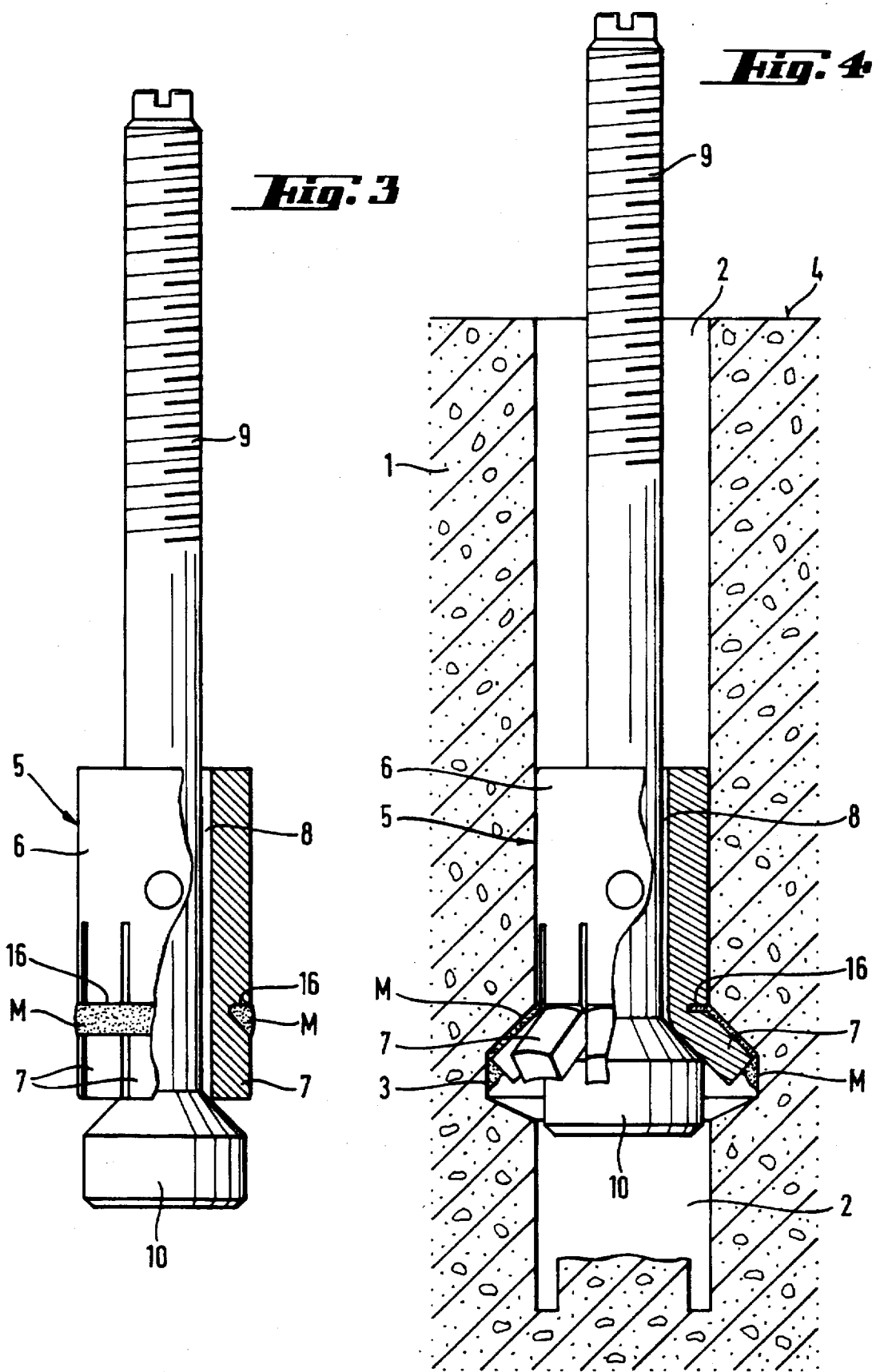

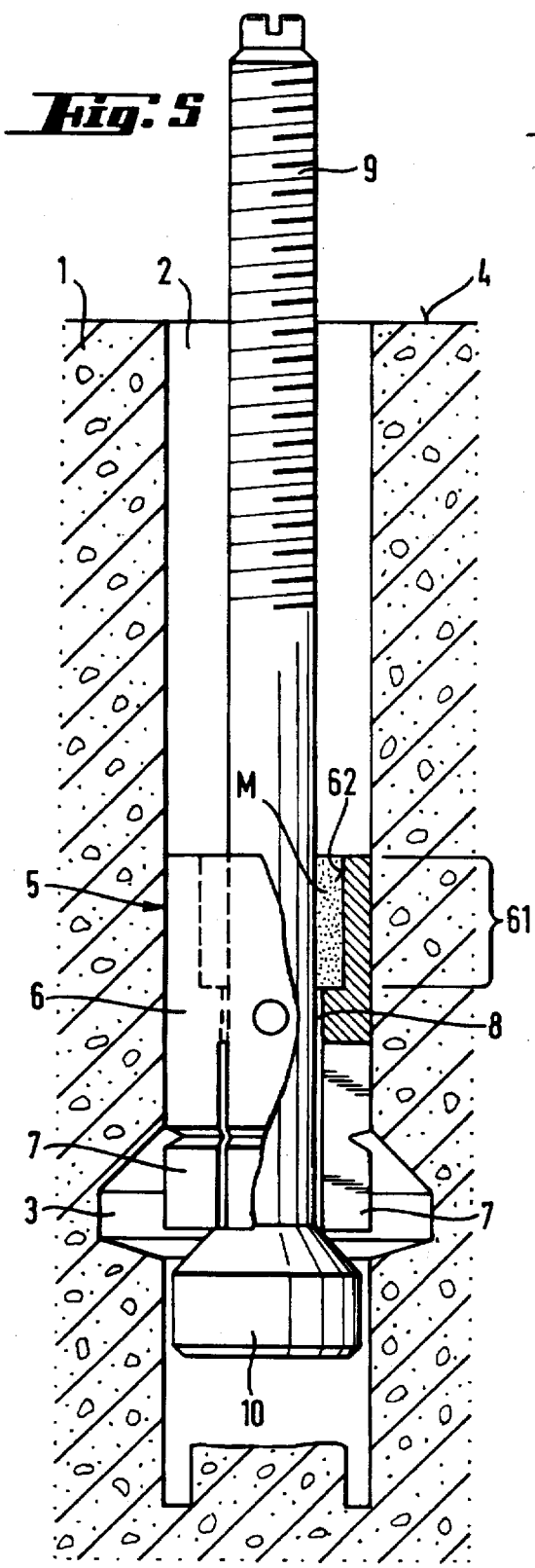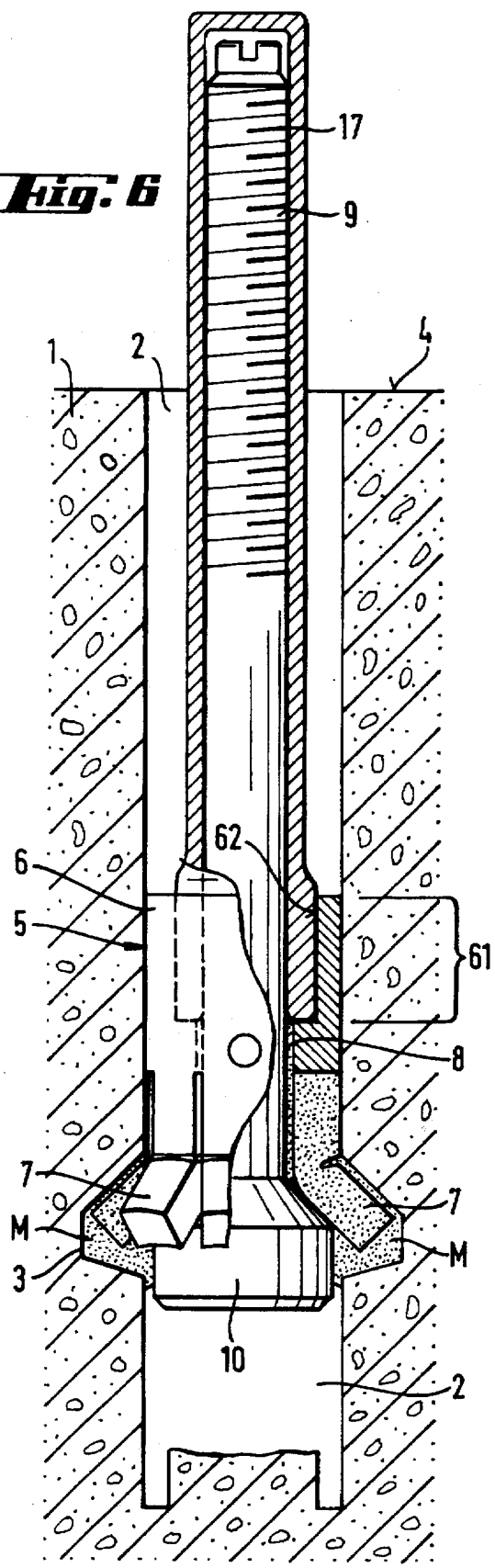

METHOD OF FORMING A PRESSURE FREE EXPANSION ANCHORAGE

BACKGROUND OF THE INVENTION

The present invention is directed to a method of forming a pressure free expansion member with segments displaceable radially outwardly into an undercut in a borehole.

In the state-of-the-art there are two basic fastening techniques for providing pressure free expansion members, one is a bonded anchor, the other is an anchor member with expanding elements for forming a positive connection. An undercut dowel is generally formed of an axially extending sleeve with an axial bore therethrough and expanding elements which can be displaced radially and a threaded rod connected to a threaded expanding member, with the rod extending through the axial bore and connected to the expanding member at the front end of the bore. The segments are displaced radially outwardly by drawing the expanding member with a controlled force via the threaded rod into the sleeve. In place of a threaded rod with an expanding member, a conical bolt can be used and positioned in the bore so that its conical front end can be drawn into the bore. As a result, the expansion elements are displaced radially outwardly by driving the sleeve over the conical expansion. To form the anchorage, a cylindrical borehole is generally drilled in a base material in which the anchorage is to be formed. An undercut is produced at a specific depth in the borehole with suitable devices known in the art. Next, the undercut dowel is inserted into the borehole. The segments to be displaced are positioned in the region of the undercut. When the dowel is anchored, the segments are displaced radially outwardly into the undercut and a pressure free positive connection is effected. The receiving material for the anchorage is thus put under stress only when the dowel is prestressed or when it is engaged by an external load.

Anchorages with undercut dowels are used especially when heavy loads are to be secured. Because of the positive connection, the absence of expansion pressure, small axial and edge distances are possible. Undercut dowel systems have an adequate load carrying capacity even when the base material for the anchorage is cracked.

The second type of expansion free anchors are the bonded anchors. Bonded anchors include an anchor rod inserted into a borehole previously filled with an organic or inorganic bonding mortar or material. As a rule, a bonded anchor has an anchor rod with a point like leading end and a mortar cartridge to set the bonded anchor. First a borehole is provided in the base material forming the anchorage and, subsequently, a mortar cartridge with a sufficient amount of mortar is pushed into the borehole. During the setting procedure of the bonded anchor, the cartridge is destroyed, for example, by the pointed leading end of the anchor rod. The anchor rod is driven in by a hammer drill with a pulsating rotation movement. At the same time, the cartridge, usually formed a glass, is completely shattered. A mortar of high strength, usually setting in a relatively short time, is produced from the consolidated components of the mortar cartridge.

Bonded anchors are distinguished by the absence of expansion pressure and, therefore, can be used with smaller axial and edge distances than conventional anchors. The holding force of a bonding anchor is achieved by an adhesive bond between the mortar and the wall of the borehole and of the anchor rod which is sufficiently high. Bonded anchors are, therefore, also used for heavy load fastenings.

Bonded anchors are particularly advantageous for fastenings in damp receiving materials forming the anchorage, for example, in a tunnel and in harbor installations.

SUMMARY OF THE INVENTION

Therefore, it is a primary object of the present invention to improve the known methods of forming pressure free expansion anchors, so that the usefulness of the anchors is further improved. The anchors can provided high load values with little displacement. At the same time, it is possible, even in a cracked base material, to provide a pressure free expansion anchor which experiences only slight displacement paths, attains adequately high load values and offers adequate safety even in cracked material and further, it should be possible to carry out the method without additional expenditures.

In accordance with the present invention, to provide a pressure free expansion anchor, a basically cylindrical borehole is formed in the base material forming the anchorage and the borehole is provided at a specific depth with an undercut. An undercut dowel is inserted into the borehole and the dowel comprises a sleeve with segments which can be displaced radially to produce a positive fit or engagement in the region of the undercut in the borehole. A curable mortar is introduced into the region of the undercut in the borehole and after being cured forms a bond in the region of the undercut with the segments displaced outwardly from the sleeve of the undercut dowel.

The borehole with the undercut can be provided by producing a cylindrical borehole first and subsequently providing it with the undercut at a specific depth by means of a suitable tool, or by preparing the undercut and the borehole in the same operation.

The method of the present invention provides a pressure free expansion anchor which combines the advantages of the positively fitting anchor formed by the undercut dowel with the advantages of a bonded anchor. The result an anchorage superior in its load values to a positive anchorage or to an anchorage based only on an adhesive bond. The mortar introduced into the region of the undercut forms an adhesive bond with the dowel sleeve at least in the region of the undercut. As a result, the area available for the transfer force on the load is increased. This has a very advantageous effect in cracked base material and especially where the cracks tend to expand. The method can be carried out without any major additional expenditure. The load values to be supported by the anchor embodying the present invention can be improved even further by using a mortar which, when cured, expands in the region of the undercut.

In an advantageous variation of the method, the mortar is introduced before the expansion dowel is inserted into the borehole. The amount of mortar introduced is matched to the size of the undercut which is to be filled. In this way, it is insured that the expansion anchor can be inserted easily and, during the insertion of the anchor, no excess mortar is pressed out of the borehole.

To feed the mortar into the undercut of the borehole, a basically cylindrical device with an axial borehole therethrough is used having a collar at one end and is provided in the region of its opposite end with transverse boreholes connected to the axially extending borehole with the transverse boreholes located in the region of the undercut. The collar at one end of the cylindrical device serves as a depth stop, since the distance between the transverse boreholes and the collar corresponds to the depth of the undercut into the borehole. In this manner it is assured that the mortar is directed exactly into the region of the undercut.

By adjusting the viscosity of the mortar, when it is directed into the undercut in the borehole it adheres to the borehole wall, problem free introduction of the expansion dowel into the borehole is assured.

In another and particularly advantageous embodiment of the method, the mortar is introduced while the expansion anchor is being inserted into the region of the undercut in the borehole. As a result, an additional device for introducing the mortar into the undercut can be omitted. Moreover, problems during the introduction of the expansion dowel which occur, for example, owing to the fact that the viscosity of the mortar has not been adjusted correctly and the mortar has flowed into the base of the borehole, can be avoided in this manner.

In another variation of the method, the mortar is filled into a peripheral groove in the sleeve of the expansion dowel before the dowel is inserted. The peripheral groove is provided in the region in which the segments pivot outwardly into the undercut. In this manner, the mortar is exactly at the region of the undercut after the expansion dowel is inserted. The geometry of the peripheral groove is such that the groove become smaller as the segments are pivoted outwardly and that the mortar within the groove is displaced into the region of the undercut. Furthermore, the geometry of the peripheral groove is selected to insure that the mortar volume is sufficient for completely filling the undercut region. The outside diameter of the region of the dowel sleeve which adjoins the pivoted region of the segments that are displaceable radially outwardly and extends to the rear end of the sleeve in such a way that it prevents mortar from being displaced from the peripheral groove in the direction of the surface of the base material in which the anchorage is formed.

In yet another embodiment of the present invention particularly for undercut expansion dowels having a threaded rod engaged in a threaded expansion member so that the rod passes through the axial borehole of the sleeve, a measured amount of mortar is filled into an annular gap provided in the sleeve in the threaded rod, preferably before the expansion dowel is inserted into the borehole. After the undercut expansion dowel is inserted into the borehole and after the segments are pivoted outwardly into the undercut, the mortar is pressed out of the annular gap into the undercut with the help of a cylindrical sleeve tool, the wall thickness of such tool being matched to the annular gap. The sleeve tool acts as an ejecting piston. The wall thickness of the sleeve tool is matched to the width of the annular gap so that the composition can be displaced only into the functional region of the expansion dowel in the region of the undercut.

A device for use in forming a pressure free expansion anchor comprises a basically cylindrical tube which has at one end a collar and is provided in the region of its other end with transverse boreholes and has an axially extending borehole connected with the transverse boreholes and is arranged to accommodate a application device for expressing pasty compositions. This device is arranged for introducing mortar in place before the undercut expansion dowel is inserted. The borehole in the tube is used in conjunction with the application device of known equipment for pressing one component or multi component mortars, and the amount of mortar filled in can be metered in a particularly desirably manner. The axial borehole is constructed so that it offers a good support for the application device and prevents the mortar from flowing out of the borehole and reaching the base material surface. The application device is held in the pocket only to the extent so that it can be removed manually without having to exert any great force. The collar at the end of the tube acts as a depth stop for the device inserted into the borehole. The distance between the transverse boreholes and the collar is such that, as inserted, the transverse boreholes are precisely in the region of the undercut. The external diameter of the device corresponds approximately to the external diameter of the undercut expansion dowel provided for the anchor.

An undercut expansion dowel which can be anchored in the inventive method, comprises a threaded rod fastened to a threaded expansion member, and a sleeve provided with the segments which can be displaced radially outwardly. The sleeve has an axially extending borehole and at least two regions with different inside diameters, the region extending from the pivoted section for the segments to the rear end of the sleeve which is facing opposite the setting direction has the larger inside diameter. In this way, an annular gap, reserved for accommodating the mortar to be introduced into the borehole, remains free between the threaded rod and the trailing region of the sleeve with the larger inside diameter. After the segments are displaced outwardly the mortar in the annular gap is displaced into the functional region of the undercut dowel. Before this can occur, the mortar cannot come in contact with the wall of the borehole. As a result, the mortar only reaches the region of the undercut.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawings:

FIG. 1 shows a borehole in a receiving base material with an undercut and a mortar filling device inserted into the borehole;

FIG. 2 is an axially extending section of an undercut expansion dowel anchored in the borehole shown in FIG. 1;

FIG. 3 is an axially extending view of an undercut expansion dowel for carrying out an embodiment of the method of the present invention;

FIG. 4 is an axially extending view of the undercut expansion dowel of FIG. 3 shown anchored in a borehole;

FIG. 5 is an axially extending view of an undercut expansion dowel for carrying out another embodiment of the method of the present invention; and FIG. 6 is a view similar to FIG. 5 with the undercut expansion dowel shown in an anchored condition.

DETAILED DESCRIPTION OF THE INVENTION

In FIG. 1 a base material 1, for example, concrete, is shown in which an anchorage is to be formed. A basically cylindrical borehole 2 is produced in an known manner in the base material. Subsequently, an undercut 3 is produced at a specific depth in the borehole using special undercutting equipment. The production of an undercut 3 at a specific depth in a borehole is known and illustrated, for example, in the catalog, "Produkte und Anwendungen" 1995 (Products and Applications 1995) section 4, page 8 of Hilti Aktiengesellschaft. A measured amount of an organic or inorganic mortar, which optionally swells upon curing, is introduced into the undercut 3. For this purpose, a special filling device 11 is inserted in borehole 2.

An axially extending cylindrical tube with a collar 12 at its trailing end and with transverse boreholes 14 located adjacent its opposite leading end, has an axially extending borehole 13 extending from the trailing end to the transverse boreholes 14. The borehole 13 is arranged to receive an application device, formed as a static mixer, of an expressing equipment, not shown, for pasty materials. The borehole 13 is arranged for use in conjunction with the application device 15 of known expressing equipment for a single component or a multi-component mortar in which the amount of mortar filled can be metered in a very effective manner. Such expressing equipment is sold, for example by Hilti Aktiengesellschaft and is shown, for example in the above mentioned product catalog at section 4, page 52. The axially extending borehole 13 is arranged so that it offers good support for the application device 15 and prevents the expressed mortar from reaching the base material surface. On the other hand, the application device 15 is secured within the borehole 13 only to the extent that it can be removed manually without expending much force. The collar 12 is supported at the surface of the anchoring base material and acts as a depth stop for the filling device 11 inserted in the borehole with the distance between the transverse boreholes 14 and the surface of the collar facing the base material being such that in the inserted state of the filling device, the transverse boreholes 13 are exactly in the region of the undercut 3. The outside diameter of the tubular filling device 11 is approximately the same as the outside diameter of the undercut expansion dowel provided for the anchorage. After a measured amount of mortar has been directed into the undercut 3 of the borehole 2, the expansion dowel 5 in FIG. 2 is inserted. The dowel includes an axially extending sleeve 6 with segments 7 at its leading end which can be displaced radially outwardly and with the sleeve forming a through hole 8. An axially extending threaded rod 9 extends through the hole 8 and is connected at its front end with a threaded expanding member 10. The expanding member 10 effects the radially outward displacement of the segment 7 into the undercut, as a result, the expansion dowel is anchored in a positive manner in the borehole 2 and does not exert any pressure on the base material 1 forming the anchorage. The region of expansion dowel 5 affording the positive locking action, is embedded in the mortar previously introduced into the undercut 3, as indicated by the dotted section in the FIG. 2. In this region of the expansion dowel 5 the cured mortar forms an adhesive bond with sleeve 6. The mortar also forms an adhesive bond with the base material 1 forming the anchorage in the region of the undercut 3. The adhesive bond supports the holding action of the undercut expansion dowel 5 and consequently attains a higher load value than a conventionally anchored expansion dowel. The mortar/sleeve bond enlarges the region of the expansion dowel, particularly in the case of the mortar, which swells and expands upon curing and has a positive effect when there are cracks in the base material forming the anchorage.

In another embodiment of the present invention, the organic or inorganic mortar is brought together with the undercut expansion dowel in the borehole. An undercut expansion dowel 5, suitable for this purpose, is shown in FIG. 3. The dowel 5 comprises an axially extending sleeve 6 with segments 7 at its leading end which segment can be displaced radially outwardly and there is an axially extending through hole 8 in the sleeve. An axially extending threaded rod 9 is passed through the hole 8 and a threaded expanding number 10 is secured to its leading end so that the cooperation between the expanding member and the segments 7 effect the radially outward displacement of the segments. It is the function of the expanding member 10 to radially displace the segments 7. In the region where the segments pivot outwardly from the sleeve 6, the sleeve is provided with a peripheral groove 16 in its outer surface formed to receive a measured amount of mortar. The capacity of the groove 16 is designed so that, after anchoring, the whole of the functional region of the undercut expansion dowel is surrounded by curing or cured mortar. Before the insertion of the undercut expansion dowel 5, the peripheral groove 16 is filled with a measured amount of the mortar, which optionally swells during curing. In FIG. 3, the mortar, contained in the peripheral groove 16, is indicated by the dotted area. Subsequently, the undercut expansion dowel 5, along with the mortar M, can be inserted into the borehole 2 containing the undercut 3.

FIG. 4 shows the undercut expansion dowel 5 of FIG. 3 in the inserted anchored state with the threaded expanding member 10 being drawn into the sleeve as the segments 7 are displaced radially outwardly into the undercut 3. Due to the outward displacement of the segment 7, the peripheral groove 16 is decreased in size and the mortar is displaced from the groove 16. The region of the sleeve 6 adjoining the groove 16 and extending opposite to the setting direction, has an outside diameter designed in the region of the borehole 2 in such a manner that the mortar M displaced from the groove 16 cannot flow in the direction of the surface 4 of the base material 1. Accordingly, it is assured that the mortar M is displaced into the undercut 3 of the borehole 2 and surrounds the entire functional region of the undercut expansion dowel 5, as indicated by the dotted area in FIG. 4.

FIG. 5 shows an undercut expansion dowel 5 which can be used in another embodiment of the method of the present invention. In this embodiment, the mortar M, along with the undercut expansion dowel 5, is placed into the borehole 2. The expansion dowel 5 has a sleeve 6 with segments 7 which can be displaced radially outwardly, a through hole 8 and an axially extending threaded rod 9 passing through the hole 8 and connected in the region of the segments 7 with a threaded expanding member 10. By means of drawing the expanding member 10 into the sleeve 6, the segments 7 are displaced radially outwardly for effecting the anchoring of the dowel 5. The sleeve has at least two regions with different internal diameters. One region 61 of the sleeve is at its trailing end, and the articulated region of the segments has a larger internal diameter. The resulting annular gap 62 is arranged to accommodate a measured amount of mortar. Before the undercut expansion dowel 5 is inserted, the mortar is filled into the annular gap 62. The undercut dowel 5 is inserted into the borehole 3 in the receiving material 1 forming the anchorage and provided with the undercut 3.

In FIG. 6 an undercut expansion dowel 5, as in FIG. 5, is shown inserted into the borehole 3 in the anchored state. By pulling the threaded expanding member 10, by means of the threaded rod 9, into the dowel sleeve, the segments 7 are swung out or pivoted outwardly into the prepared undercut 3. As a result, the dowel 5 is positively anchored in the borehole 3. Subsequently, mortar M, filled in the annular gap 62, is pressed out of the gap 62. The pressing action is provided by an axially extending sleeve tool 17 having an open end inserted over the threaded rod 9 and extending into the borehole and into the annular gap. The sleeve tool 17 is formed of an axially-extending cylindrical tube having an inside dimension such that it can slide into the annular gap 62. The sleeve tool 17 acts as an ejecting piston and displaces mortar from the annular gap into the part of the undercut expansion dowel in the region of the undercut 3. The internal diameter and external diameter of the sleeve tool are dimensioned so that the displaced mortar M flows only in the direction of the undercut 3. Accordingly, it is insured that the entire region of the undercut expansion dowel 5 is surrounded by curing or cured mortar, as indicated by the dotted region in FIG. 6.

The method of the present invention for providing pressure free expansion anchors combines the advantage of the positive anchorage afforded by an undercut expansion dowel and the advantages of a bonded anchor. The result is an anchorage, which in its load bearing value is superior to a strictly positive anchorage or to one based only on an adhesive bond. The mortar, introduced into the region of the undercut, forms an adhesive bond with the sleeve, at least in the region of the undercut. Accordingly, the area, available for the transfer of forces on the load, is increased. This has a very advantageous effect, particularly in a cracked base material forming the anchorage or where the cracks tend to expand. The method can be carried out without major additional expense.

While specific embodiments of the invention have been shown and described in detail to illustrate the inventive principles it will be understood that the invention may be embodied otherwise without departing from such principles.

We claim:

1. A method of forming a pressure-free expansion anchor in a substantially cylindrical borehole formed in an anchorage base material with an undercut at a specific depth within the borehole, where the anchor includes an undercut expansion dowel inserted into the borehole with the undercut expansion dowel comprising an axially extending sleeve (6) with axially-extending segments (7) for radially outward displacement into the undercut for affording a positive lock for the expansion dowel in a region of the undercut, wherein the method comprises the steps of introducing a curable mortar (M) into the region of the undercut within the borehole (4), for effecting, when cured, a bond with the segments (7) of the sleeve (6) in the undercut, introducing the mortar (M) into the region of the undercut (3) of the borehole (2) while inserting the expansion dowel (5) into the borehole, prior to the insertion of the expansion dowel (5) into the borehole (2), filling the mortar (M) into a peripheral groove (16) in an exterior surface of the sleeve (6) of the expansion dowel (5) with the peripheral groove located in a region at which the segments (7) are pivoted outwardly and displacing the mortar (M) after the insertion of the expansion dowel (5) into the borehole by displacing the segments (7) radially outwardly so that the mortar is pressed from the peripheral groove (16) into the region of the undercut (3).

2. A method of forming a pressure-free expansion anchor in a substantially cylindrical borehole formed in an anchorage base material with an undercut at a specific depth within the borehole, where the anchor includes an undercut expansion dowel inserted into the borehole with the undercut expansion dowel comprising an axially extending sleeve (6) with axially-extending segments (7) for radially outward displacement into the undercut for affording a positive lock for the expansion dowel in a region of the undercut, wherein the method comprises the step of introducing a curable mortar (M) into the region of the undercut within the borehole (4), for effecting, when cured, a bond with the segments (7) of the sleeve (6) in the undercut, introducing the mortar (M) into the region of the undercut (3) of the borehole (2) while inserting the expansion dowel (5) into the borehole, before inserting the expansion dowel (5) into the borehole (2), filling a measured amount of mortar (M) into an annular gap (62) formed in a trailing end of the sleeve (6) encircling a threaded rod (9), inserting the expansion dowel with the mortar in the annular gap into the borehole, and displacing the segments (7) radially outwardly and pressing the mortar from the annular gap into the undercut (3) with the help of an axially extending sleeve tool (17).

3. An undercut expansion dowel for providing a pressure-free expansion anchor in a substantially cylindrical borehole formed in an anchorage base material with an undercut at a specific depth within the borehole, comprising an axially extending threaded rod (9) having a leading end with an attached threaded expanding member, an axially extending sleeve (6) having a leading end with axially extending pivotable segments (7), said sleeve having at least one axially extending through hole with at least two regions of different internal diameters, said sleeve having a region (61) extending in the axial direction from a pivoting region of said segments to a trailing end of said sleeve and forming an annular gap having a larger internal diameter than an axially-extending part of said sleeve extending towards a leading end thereof from a region at which the segments (7) are pivoted.

\* \* \* \* \*